(12) United States Patent
Power et al.

(10) Patent No.: US 9,266,438 B2
(45) Date of Patent: Feb. 23, 2016

(54) BUDDY CHARGING FOR ELECTRIC VEHICLES

(71) Applicant: Tata Technologies Pte Ltd., Singapore (SG)

(72) Inventors: Kevin Power, Novi, MI (US); Casey Mehta, Novi, MI (US); Anthony Jones, Novi, MI (US)

(73) Assignee: Tata Technologies Pte Ltd, Singapore (SG)

( * ) Notice: Subject to any disclaimer, the term of this patent is extended or adjusted under 35 U.S.C. 154(b) by 281 days.

(21) Appl. No.: 13/737,101

(22) Filed: Jan. 9, 2013

(65) Prior Publication Data
US 2013/0175973 A1 Jul. 11, 2013

(30) Foreign Application Priority Data

Jan. 9, 2012 (IN) .............................. 78/MUM/2012

(51) Int. Cl.
*H02J 7/00* (2006.01)
*H02J 7/14* (2006.01)
*B60L 11/18* (2006.01)

(52) U.S. Cl.
CPC ......... *B60L 11/1809* (2013.01); *B60L 11/1816* (2013.01); *B60L 2210/12* (2013.01);
(Continued)

(58) Field of Classification Search
CPC .................................................. B60L 11/1809
USPC .................................................. 320/103, 109
See application file for complete search history.

(56) References Cited

U.S. PATENT DOCUMENTS 4,617,506 A    10/1986  Bogie et al.
5,283,513 A *  2/1994  Fujita et al. ................... 320/138

(Continued)

FOREIGN PATENT DOCUMENTS

JP      2000102102    4/2000

OTHER PUBLICATIONS

AAA "AAA Unveils North America's First Roadside Assistance Truck Capable of Charging Electric Vehicles"—http://www.prnewswire.com/news-releases/aaa-unveils-north-americas-first-roadside-assistance-truck-capable-of-charging-electric-vehicles-125760263.html retrieved Jan. 8, 2012.

(Continued)

*Primary Examiner* — Samuel Berhanu
*Assistant Examiner* — Tessema Kebede
(74) *Attorney, Agent, or Firm* — Merchant & Gould P.C.

(57) ABSTRACT

A system for charging power source of a recipient electric vehicle using an accelerated charge flow from a power source of a donor vehicle, the system comprising; recipient power source provided with an accessible recipient charge receptacle; donor power source provided with an extendable donor charge receptacle adapted to resiliently engage the recipient charge receptacle; a pack controller, in each donor and recipient vehicle, electrically connected to the acceptor and donor power sources and adapted to combine the functions of a battery pack protection circuit, battery charger, current and voltage regulator, a data monitor and a communication circuit associated with the charge transfer from the donor to acceptor vehicle facilitating regulated and informed power transfer; and a buck-booster electrically connected to the recipient and donor receptacles of the battery in each vehicle, configured to balance relative electrical potentials of the donor to the recipient vehicle.

8 Claims, 6 Drawing Sheets

(52) U.S. Cl.
CPC .......... *B60L2210/14* (2013.01); *B60L 2210/30* (2013.01); *Y02T 10/7005* (2013.01); *Y02T 10/7225* (2013.01); *Y02T 10/7233* (2013.01); *Y02T 10/7241* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 5,635,818 | A * | 6/1997 | Quintero | 320/105 |
| 7,443,049 | B1 * | 10/2008 | Jones et al. | 307/9.1 |
| 2007/0187376 | A1 * | 8/2007 | Albrecht et al. | 219/130.1 |
| 2008/0215200 | A1 * | 9/2008 | Toth | 701/22 |
| 2009/0309422 | A1 * | 12/2009 | Helmick | 307/53 |
| 2010/0273427 | A1 | 10/2010 | Mergen et al. | |
| 2011/0012553 | A1 | 1/2011 | Sloan et al. | |
| 2011/0013322 | A1 * | 1/2011 | Gale et al. | 361/42 |
| 2011/0025267 | A1 | 2/2011 | Kamen et al. | |

OTHER PUBLICATIONS

"How to Charge a Car Battery"—http://www.ehow.com/how_2063040_charge-car-battery.html retrieved Jan. 8, 2012.

* cited by examiner

BUDDY CHARGING FOR ELECTRIC VEHICLES

This application claims benefit of Serial No. 78/MUM/2012, filed 9 Jan. 2012 in India and which application is incorporated herein by reference. To the extent appropriate, a claim of priority is made to the above disclosed application.

FIELD OF THE INVENTION

The present invention relates generally to charging of an electric vehicle and more particularly, to charging two vehicles with an electrical power supply, when conventional charging facilities are unavailable.

DESCRIPTION OF THE BACKGROUND ART

Hydrocarbon based fuels are most commonly used fuels to drive automotive engines. However with the rising price of hydrocarbon based fuels and environmental concerns associated therewith, use of several alternative fuels such as bio-fuels, solar and electric energy has emerged in the art for powering the automotive engines. Amongst such alternative fuels the electric energy is a preferred alternate source since it is readily available and most cost effective. Electric vehicles generally use lead-acid, Nickel metal hydride, molten salt and lithium ion batteries for propulsion.

The batteries of the electric vehicle must be periodically recharged. Most electric vehicle owners recharge the batteries at home, since it is convenient and there are fewer public facilities available. However with an electric vehicle, it is possible that the battery may exhaust in a place where there is no access to a suitable power source that can charge the battery. This is analogous to "running out of gas" in a conventional internal combustion engine vehicle. The problem of exhausting a battery in an electric vehicle before it can be recharged remains active in the mind of driver and is referred to as "range anxiety". Such a problem perceived by the driver is resultant of two factors: firstly, today there is a limited range of electric vehicles compared to conventional internal combustion engine vehicles and secondly, limited charging infrastructure available for electric vehicles.

In such circumstances there are always possibilities that the vehicle is immobilized because of depletion of electric charge and cannot move using its own power. One of the options for driver in such circumstances is to arrange for vehicle to be towed so that it can be shifted to suitable charging source. Another alternative is to bring a source of electric power to immobilized vehicle so as to feed electric charge to the battery. Both alternatives are inconvenient methods for re-charging the depleted battery especially in the cases when battery is depleted on a highway or in remote locations.

Thus, there is a long-felt need for a system and method that enables the charging of a depleted battery of an electric vehicle in a convenient manner.

OBJECTS OF THE INVENTION

The principal object of the present invention is to provide a system and method for charging battery of an electric vehicle, using electrical power supply of another vehicle wherein the vehicle receiving the electric charge is recipient and the one transmitting is termed as donor.

Another object of the present invention is to provide a system and method that ensures uniform charge flow between the recipient vehicle and donor vehicle by employing a buck/boost converter that is adapted for controlling voltage.

Yet another object of the present invention is to provide a communication path between the donor and the recipient vehicle using pack controllers.

SUMMARY OF THE INVENTION

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into, and constitute a part of this specification. The drawings illustrate various embodiments of the invention and together with the description serve to explain the principles and operation of the invention.

The principal aspect of the invention is to provide a system for charging a first electric vehicle, referred interchangeably as recipient vehicle in this specification using a donor vehicle that enables an accelerated charge flow to such recipient vehicle, the said system comprising; a recipient power source housed within the recipient electric vehicle provided with an accessible recipient charge receptacle; a donor power source housed within the donor vehicle provided with a extendable donor charge receptacle adapted to resiliently engage the recipient charge receptacle; a pack controller, in each of those recipient and donor vehicles, that is electrically connected to the acceptor and donor power sources and is adapted to combine the functions of a battery pack protection circuit, battery charger, current and voltage regulator, a data monitor and a communication circuit associated with the charge transfer therefrom the donor to acceptor vehicle facilitating regulated and informed power transfer; and a buck-booster electrically connected to the recipient and donor receptacles of the battery in each vehicle which is configured to balance a relative electrical potentials of the donor to the recipient vehicle.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION OF THE PREFERRED EMBODIMENTS

Figure 1:
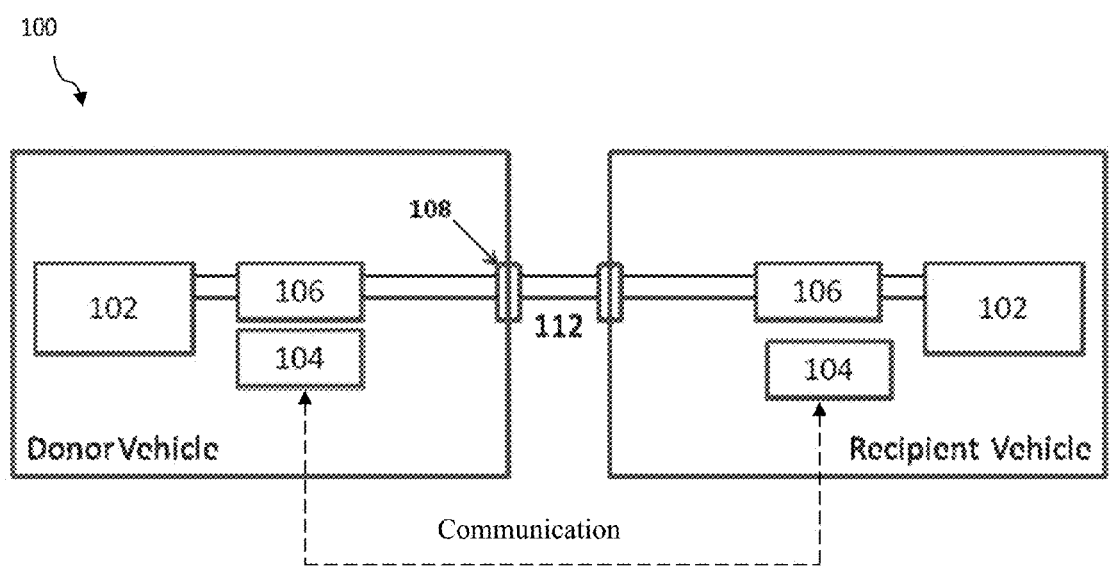
FIG. 1 is a perspective view of a buddy charging according to an embodiment of the present invention.

As used in this specification and claims, the terms "for example," "for instance," "such as," and "like," and the verbs "comprising," "having," "including," and their other verb forms, when used in conjunction with a listing of one or more components or other items, are each to be construed as openended, meaning that that the listing is not to be considered as excluding other, additional components or items. Other terms are to be construed using their broadest reasonable meaning unless they are used in a context that requires a different interpretation.

It must also be noted that as used herein and in the appended claims, the singular forms "a," "an," and "the" include plural references unless the context clearly dictates otherwise. Although any apparatus, methods, and devices similar or equivalent to those described herein can be used in the practice or testing of embodiments of the present invention, the preferred, apparatus and parts are now described.

Definitions

Buck-booster: The term buck-booster in this specification shall have a meaning of a DC-to-DC converter that has an output voltage magnitude that is either greater than or less than the input voltage magnitude.

Pack Controller comprise the following components: a processor (104a), the buck/boost module (106) comprising the DC to DC convertor (104b), an onboard charger (104c), a GFI (104d) and a pre charge relay (104e). The Pack Controllers are at both donor and recipient vehicles and maintain communication path between between such vehicles to coordinate buddy charging.

In the electric vehicle industry, an emerging standard is being defined for the various voltage and current levels used for charging. These are referred to as "Level 1, Level 2 and Level 3". A definition of the various levels is given below:

TABLE I

| Level | Definition |
|---|---|
| Level 1 | AC energy to the vehicle's on-board charger; from the most common U.S. grounded household receptacle, commonly referred to as a 120 volt outlet. |
| Level 2 | AC energy to the vehicle's on-board charger; 208-240 volt, single phase. The maximum current specified is 32 amps (continuous) with a branch circuit breaker rated at 40 amps. Maximum continuous input power is specified as 7.68 kW (=240 V × 32 A*). |
| Level 3 | DC energy from an off-board charger; there is no minimum energy requirement but the maximum current specified is 400 amps and 240 kW continuous power supplied. |

The present invention discloses a system for charging an electric vehicle, wherein a donor vehicle enables an accelerated charge flow to a recipient vehicle, the said system comprising; a recipient power source housed within the recipient electric vehicle provided with an accessible recipient charge receptacle; a donor power source housed within the donor vehicle provided with a extendable donor charge receptacle adapted to resiliently engage the recipient charge receptacle; a pack controller, in each vehicle, electrically connected to the acceptor and donor power sources and adapted to combine the functions of a battery pack protection circuit, battery charger, current and voltage regulator, a data monitor and a communication circuit associated with the charge transfer therefrom the donor to acceptor vehicle facilitating regulated and informed power transfer; and a buck-booster electrically connected to the recipient and donor receptacles of the battery in each vehicle which is configured to balance a relative electrical potentials of the donor to the recipient vehicle.

FIG. 1 illustrates a system (100) for charging an electric vehicle, a donor vehicle enabling an accelerated charge flow to a recipient vehicle.

The present invention discloses a system (100) comprising a donor vehicle and a recipient vehicle configured commonly with a battery module (102), a pack controller (104), a buck/boost module (106) and a charge port (108).

In an embodiment of the invention, the donor vehicle is adapted to provide flow of charge from the charging port (108) of donor to the charging port (108) of the recipient vehicle for charging the depleted battery of the recipient vehicle. The system (100) is neither restricted to charge flow from the donor vehicle to the recipient vehicle. The charge flow can be bi-directional from the recipient vehicle to the donor vehicle and vice-versa. The system (100) further comprises a charge cable (112) coupled with the charge port (108) of the recipient vehicle on the one side and the donor vehicle on the other.

In another embodiment of the invention the battery module (102) comprises a plurality of batteries coupled with each other. The batteries may be connected with each other via bus bar. The battery module (102) can be enclosed in a pack (114) manufactured from at least one material selected from the group of aluminium, steel, brass, tin, sterling silver, titanium, alloy, fibre reinforced plastic or combination thereof.

In another embodiment of the invention, the pack controller (104) of the recipient and donor vehicle is adapted to establish a communication path amongst them. The communication is established amongst the vehicles (recipient and donor) such that the respective pack controller (104) can coordinate buddy charging. Thus the pack controller (104) acts as hardware control system that allows battery charging, involving two vehicles (recipient and donor) fitted with electrical power supply, when conventional charging facilities are not available or cannot be made available.

In another embodiment of the invention, the pack controller (104) present at each of the vehicle is adapted for coordination of energy transfer between the donor and recipient and is controlled by the respective pack controller (104) utilizing communication between two units. The pack controller (104) is adapted to control overall process (DC charge voltage, current and charge time) utilizing feedback loops.

In another embodiment of the invention, the buck boost module (106) comprises a DC/DC converter. The DC/DC converter is bi-directional. The DC/DC converter is adapted to buck i.e. input voltage is greater than output voltage and boost i.e. Input voltage is less than output voltage during charging process.

In another embodiment of the invention, the system (100) further comprises a plurality of switches (402, 404) to enable the system (100) to selectively adapt to the level of charging required as per table (A). All of the elements (102,104,106 and 108) are housed within the electric vehicle except for the charge cable (112). In one embodiment of the invention the two vehicles involved in the scheme must have a means of physical electrical connection using the cable (112) that is capable of carrying the required charge current to enable buddy charging.

Figure 2:
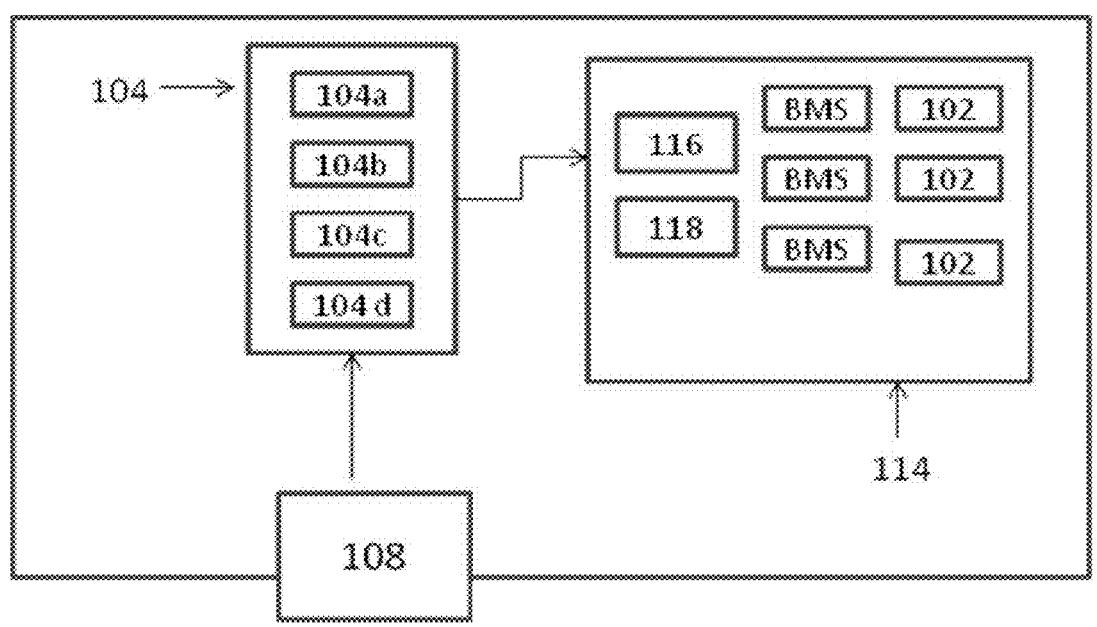
FIG. 2 illustrates the typical architecture of an electric vehicle battery and associated control system.

FIG. 2 illustrates architecture of an electric vehicle battery control system associated therewith. The disclosed architecture is used for recipient vehicle and donor vehicle in an exemplary embodiment In another embodiment of the invention, the system (100) further comprises a control system comprising the charge port (108), the pack controller (104) and the battery module (102). The charge port (108) and the pack controller (104) are coupled with each other. The charge port (108) is connected to a source of electric power. The electric power may be selected from group of power generating source such as battery, generator, electric current etc. The electric power is converted to suitable voltage and current level.

In another embodiment of the invention the charge port (108) can be manufactured from at least one material selected from the group of aluminum, steel, brass, tin, sterling silver, titanium, alloy, fiber reinforced plastic or combination thereof.

In another embodiment of the invention the pack controller (104) further comprises a processor (104a), the buck/boost module (106) comprising the DC to DC convertor (104b), an onboard charger (104c), a GFI (104d) and a pre charge relay (104e).

In another embodiment of the invention, the battery pack (114) is provided to encapsulate the plurality of battery module. The battery pack (114) is manufactured from at least one material selected from the group of aluminium, steel, brass, tin, sterling silver, titanium, alloy, fibre reinforced plastic or combination thereof.

In another embodiment of the invention the system (100) further comprises a high voltage fuse (116) and a contactor (118) disposed in the battery pack (114) to complete the circuit and enable communication with the at least one pack controller (104) which further communicates with the charge port (108). In order for the overall Buddy Charging scheme to work, the Pack Controller (104) on the donor vehicle and the Pack Controller (104) on the recipient vehicle are enabled to communicate charging data with each other using the processors.

Figure 3:
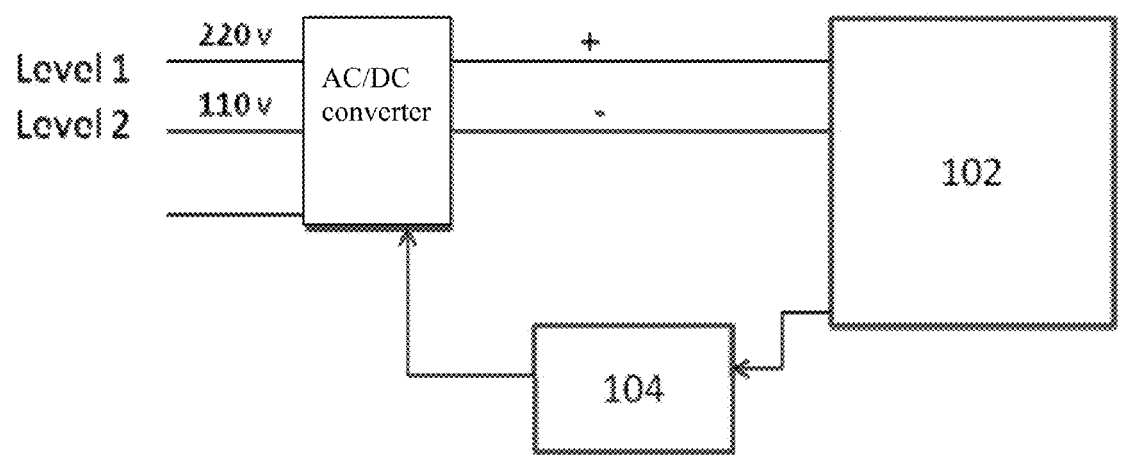
FIG. 3 illustrate an schematic diagram of the electrical charge path for level 1 and level 2 charging (as illustrated in Table 1)

FIG. 3 illustrates an electrical scheme of the electrical charge path for level 1 and level 2 charging (as illustrated in Table 1).

In case of Level 1 and Level 2 charging only (shown in FIG. 3), the operation of the circuit is described as follows: Three phase or Two phase alternating voltage and current is obtained from conventional electrical source. The alternating voltage and current is rectified and converted into DC via the AC/DC Converter. The resulting DC current is used to charge the battery. The overall process (DC charge voltage, current and charge time) is controlled by the Pack Controller (104) utilizing certain feedback loops.

Figure 4:
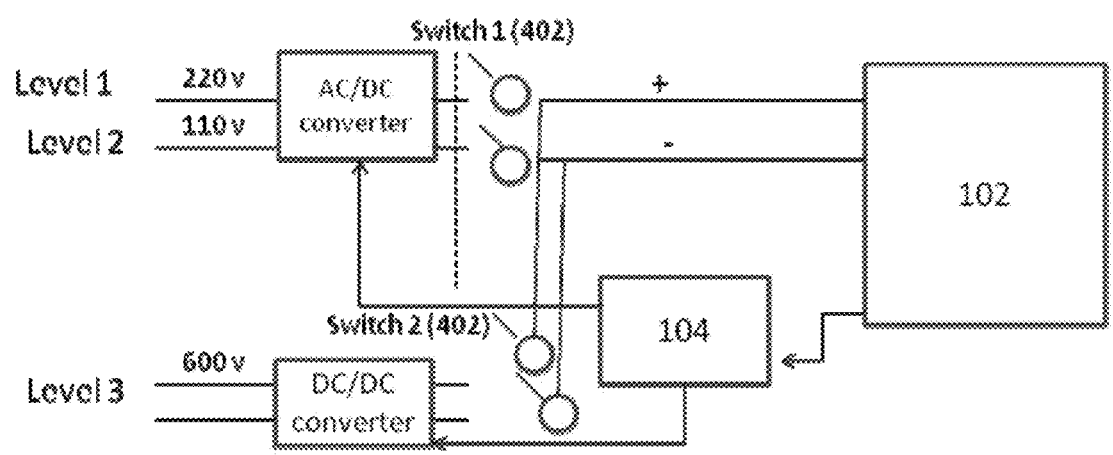
FIG. 4 illustrate an schematic diagram of electrical charge path for level 1/level 2/and level 3 charging (as illustrated in Table 1)

FIG. 4 illustrates an electrical schema of electrical charge path for level 1/level 2/and level 3 charging (as disclosed in Table 1).

In the case of Level 1/Level 2 and Level 3/Buddy Charging (shown in FIG. 4), the overall operation is described as follows. Three additional components are added to the circuit: The buck/boost module (106) comprising the DC/DC converter and the plurality switches (402), (404). The DC/DC converter is bi-directional. The DC/DC converter is capable of buck (input voltage is greater than output voltage) and boost (input voltage is less than output voltage). When Level 1/Level 2 charging are required, the Switch 1 (402) is closed; the Switch 2 (404) is open. In this case, the circuit is equivalent to that shown in FIG. 3. When Level 3/Buddy Charging are required, the Switch 1 (402) is opened, the Switch 2 (404) is closed and the DC/DC converter is used to charge the battery. The overall process (DC charge voltage, current and charge time) is controlled by the Pack Controller (104) utilizing certain feedback loops. Coordination of charge transfer between the donor and recipient is controlled by the processor in the respective pack controllers (104) utilizing communication between the two units. In another embodiment of the invention the Switch 1 (402) and the Switch 2 (404) are interlocked such that the Switch 1 (402) cannot close unless the Switch 2 (404) is open and vice versa.

In one embodiment of the invention the pack controller (104) has advanced hardware and software capabilities and since the two pack controllers are in communication, the following capabilities are incorporated into the scheme by way of programmed instructions stored in memory and executable by the processor shown in Table II below.

TABLE II

| MODULES | DESCRIPTION OF MODULES THAT PROCESSOR IN PACK CONTROLLER COULD EXECUTE |
|---|---|
| Time duration charge | Allow for a limit to the time that buddy charging between the two vehicles takes place. |
| Energy amount charge | Only allow for a certain amount of energy to be transferred during the charge cycle. Stop transfer after this has been reached |
| Charge costing | Keep track of energy been transferred and attach a cost to the energy which can then be transmitted to a commercial application for billing or other applications |
| Charge progress | Using a dynamic display in either vehicle, show the state of charge in both vehicles, time left to reach charge, rate of energy transfer and other pertinent information |
| Remote notification | Once charge process is complete, send notification to a remote device (e.g. smart phone) that charge process is complete |
| Temperature cut out | Prevent charge process in case of extreme outside temperatures (either hot or cold) |
| Battery Temperature cut out | Prevent charge process if battery temperature exceeds certain limits |
| Rate of charge | Limit rate of charge to a determined amount |

Figure 6:
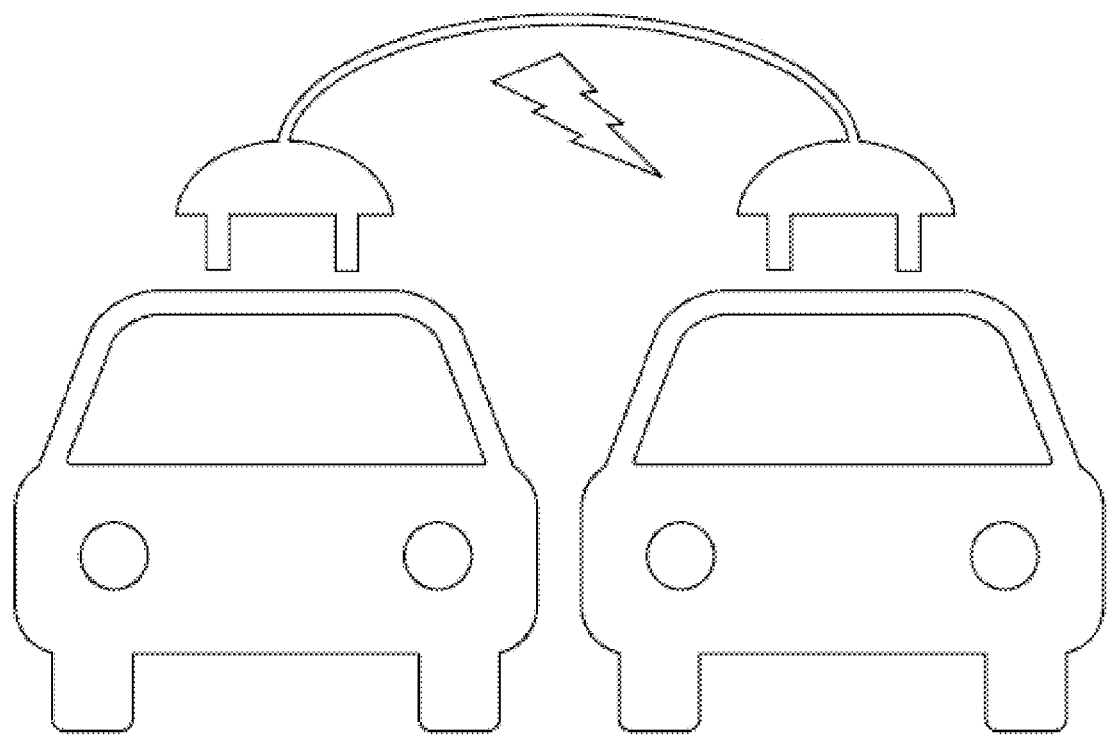
FIG. 6 illustrates an icon on a user interface provided within the vehicle.

FIG. 6 illustrates an icon provided on a user interface according to an embodiment of the present disclosure. The present disclosure provides a user interface to control the charge flow from the donor vehicle to recipient vehicle according to an embodiment.

BEST MODE OF THE INVENTION

In accordance of the invention, one can consider the following approximate values for the Buddy Charging system: Battery size—12 kWhr to 40 kWhr; Nominal battery voltage for both donor and recipient—120 V to 500 V; DC/DC converter capable of buck and boost; Charge current—10 A to 30 A; Charge cable length—2 m to 5 m; Donor vehicle battery DOD—0% to 60%; Permissible ambient temperature for Buddy Charging—0 deg C. to 50 deg C.; and Charge time—variable dependent on requirement.

Figure 5A:
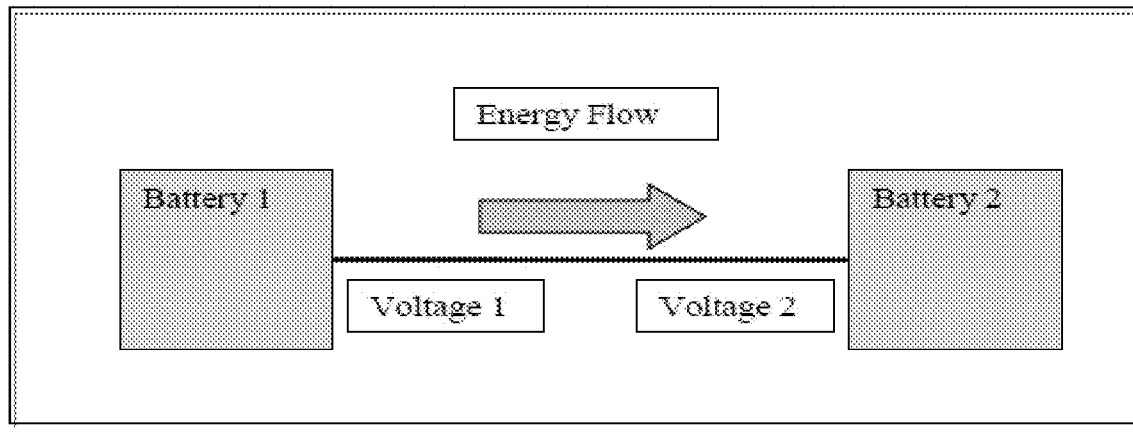
FIGS. 5(a) and (b) illustrate example depicting the capability of the buck/boost module.
Figure 5B:
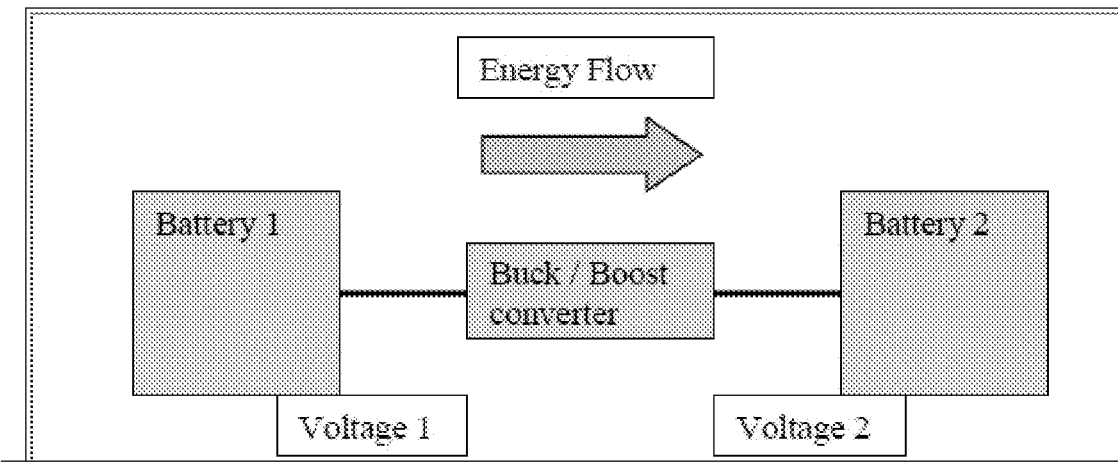

Example showing the capability of buck/boost converter is referred via FIG. 5(a) and (b). In the illustrated case FIG. 5(a), 5(b) Battery 1 is charging Battery 2 as indicated by the direction of energy flow. With a simple connection, this charge process can only occur when Voltage 1>Voltage 2. However, various situations can be constructed when Voltage 1<Voltage 2 but the direction of energy flow must still be from Battery 1 to Battery 2 (such situations may occur because of charge in Battery 1 drops below charge in Battery 2 or Battery 1 has been subject to a greater number of charge/discharge cycles). Because the buck/boost converter is capable of increasing or decreasing voltage, it can always ensure energy flow is from Battery 1 to Battery 2 regardless of the values of Voltage 1 and Voltage 2. The advantage of this setup is the greatly reduced complexity and attendant reliability.

We claim:

1. A system for charging power source of a recipient vehicle using an accelerated charge flow from a power source of a donor vehicle, the system comprising:
a recipient power source provided with an accessible recipient charge receptacle;

a donor power source provided with an extendable donor charge receptacle adapted to resiliently engage the recipient charge receptacle;

a pack controllers, present in each of the donor vehicle and the recipient vehicle, wherein the pack controllers are electrically connected to the recipient power source and the donor power source, and wherein the pack controllers are adapted to combine the functions of a battery pack protection circuit, battery charger, current and voltage regulator, a data monitor and a communication circuit associated with the charge transfer from the donor vehicle to recipient vehicle facilitating regulated and informed power transfer; and a buck-booster electrically connected to the recipient charge receptacle and the donor receptacle of the battery in present in the recipient vehicle and the donor vehicle respectively, wherein the buck-booster is configured to charge the power source of the recipient vehicle, by the donor vehicle, based on pre-defined voltage and current levels comprising level 1, level 2, and level 3, wherein the buck-booster charges the power source of the recipient vehicle by using a plurality of switches comprising a Switch 1 and a Switch 2, wherein when the Switch 1 is closed and the Switch 2 is opened, the power source is charged for the level 1 or the level 2 selected by the pack-controller, and wherein when the Switch 1 is opened and the Switch 2 is closed, the power source is charged for the level 3.

2. The system for charging the recipient vehicle of claim 1 further comprising a means for electrical connection adapted for carrying the charge current between the recipient vehicle and donor vehicle.

3. The system for charging the recipient vehicle of claim 2, wherein the means for electrical connection is a cable.

4. The system for charging the recipient vehicle of claim 1, wherein the buck-booster comprises a DC/DC converter adapted to buck the input voltage when the input voltage is greater than the output voltage and boost the input voltage when the input voltage is less than output voltage.

5. The system for charging the recipient vehicle of claim 4, wherein the DC/DC converter is adapted to flow current from the donor vehicle to the recipient vehicle and vice versa.

6. The system for charging the recipient vehicle of claim 1, wherein the pack controller on the donor vehicle and the pack controller on the recipient vehicle comprises a processor, a buck/boost module, a DC to DC convertor (104*b*), an onboard charger (104*c*), a GFI (104*d*) and a pre charge relay (104*e*).

7. The system for charging the recipient vehicle of claim 1, wherein the respective pack controller is adapted to control the coordination of energy transfer between the donor vehicle and the recipient vehicle utilizing communication between the respective pack controllers.

8. The system for charging the recipient vehicle of claim 1, wherein the level 1 indicates 120 volt, the level 2 indicates 208-240 volt, and the level 3 indicates 600 volt.

* * * * *